United States Patent [19]
Kelling

[11] 3,876,105
[45] Apr. 8, 1975

[54] HOT MELT MACHINE

[75] Inventor: Gordon L. Kelling, Minnetonka, Minn.

[73] Assignee: Possis Corporation, Minneapolis, Minn.

[22] Filed: Feb. 25, 1974

[21] Appl. No.: 445,151

[52] U.S. Cl. .......... 222/56; 222/146 HE; 219/421; 118/202
[51] Int. Cl. .......... B67d 5/62; F27b 14/06
[58] Field of Search ........ 222/146 HE, 56; 219/421, 219/422; 118/202; 126/343.5 A

[56] References Cited
UNITED STATES PATENTS

| | | | |
|---|---|---|---|
| 2,300,083 | 10/1942 | Worthington | 126/343.5 A |
| 2,809,772 | 10/1957 | Weisz | 222/146 HE |
| 3,352,279 | 11/1967 | Lockwood | 118/202 X |
| 3,377,466 | 4/1968 | Paulsen | 219/421 |
| 3,531,023 | 9/1970 | Mercer | 222/146 HE |
| 3,792,801 | 2/1974 | Baker et al. | 222/146 HE |

*Primary Examiner*—Robert B. Reeves
*Assistant Examiner*—Frederick R. Handren

[57] ABSTRACT

A hot melt machine comprises a hopper for granular thermoplastic resin having a bottom outlet across which an electrically heated melting grid extends. A funnel beneath the grid collects molten resin and guides it to fall into a small, open-topped heated reservoir spaced below it. A gear pump, driven by a constant torque motor and having its inlet communicated with a bottom outlet in the reservoir, forces the melt towards points of use. A sensor in the reservoir controls grid energization in accordance with reservoir liquid level. A heat shield between funnel and reservoir, having a hole through which melt falls, prevents reservoir heat from affecting grid operation.

11 Claims, 7 Drawing Figures

HOT MELT MACHINE

This invention relates to so-called hot melt apparatus by which resinous thermoplastic material that is initially in the solid state is melted by heating and, while molten, is delivered under pressure to a point of intermittent use; and the invention is more particularly concerned with means in such apparatus for melting resinous material at substantially the rate that it is used and for maintaining a substantially constant-volume supply of the molten material available to a pump that forces the material toward the point of use.

Molten thermoplastic resin is commonly used as an adhesive for various packaging applications, as for bonding together the cover flaps of cartons. The material is commercially supplied in its solid state, in the form of rods, pellets or granules, or relatively large blocks. For use in hot melt bonding the resin is heated to bring it to its molten state, and it is usually dispensed at a temperature high enough to insure that it will remain liquid for at least a short interval after dispensing.

The present invention is concerned with the type of hot melt apparatus that is intended to dispense comparatively large volumes of hot melt from a nozzle or nozzles at which the material is available under pressure. Such machines generally use the granular, pelletized or block-form resin.

Superficial considerations would suggest that a hot melt machine could be relatively simple, comprising merely a melting pot of adequate volume and a pump or the like that draws molten material out of the melting pot and forces it towards the dispensing nozzles.

Unfortunately, the use of a large volume melting pot is at odds with the nature of the thermoplastic material. When exposed to air while hot, the resin tends to oxidize and deteriorate. Furthermore, once melted, the resin should not be permitted to resolidify, since the material has low thermal conductivity and remelting a large solidified mass of it would put the machine out of operation for a long time. Therefore it must be possible to shut down the machine at any time without having to withdraw any substantial amount of molten resin from it.

These characteristics of the resinous material impose severe constraints upon the design of a hot melt machine. The machine should be arranged to melt and store only as much resin as will satisfy immediate needs, and should melt additional resin as quickly as the supply of molten material needs to be replenished. Since the resin chars if heated excessively, it should be melted and temporarily stored at a temperature just high enough to maintain its molten condition, and should be further heated as it is delivered to the point of use. Finally, the facility for temporarily storing the molten material should expose the least possible surface area of the hot melt to air, to avoid oxidization of it.

Various hot melt machines have been proposed from time to time. Basically, all of them represent solutions to the problem of melting resin more or less in step with the rate at which it is dispensed.

Where the molten material is used in a more or less continuous production process, the problem of synchronizing melting with dispensing is difficult enough. But the present invention is directed to solving the much more difficult problem that arises where the molten material is dispensed intermittently and at an irregular rate.

One prior approach to solving the problem to which this invention is directed has contemplated the use of an extruder screw that had a melting heater associated with it. Pelletized or granular material entered the screw from a hopper. In some cases the screw forced the material through a melting chamber and thence to a point of use, as in Lockwood U.S. Pat. No. 3,352,278, wherein a slip clutch permitted the screw to stop rotating when sufficient molten material was available. Alternatively, the screw rotated in a heated casing, so that the material was melted as it was advanced by the screw. Hummell U.S. Pat. No. 3,028,833 discloses such apparatus wherein a pressure responsive switch stopped rotation of the screw when a sufficient quantity of molten material had been built up. In the machine of Paulsen U.S. Pat. No. 3,398,717 the screw fed molten material to a gear pump which delivered it to a point of use, and a relief valve at the outlet of the gear pump recirculated molten material back through the screw at times when hot melt was being drawn off at a rate lower than the feed rate of the screw.

Apparatus incorporating such an extruder screw tends to be complicated and expensive, and the present invention is therefore directed to providing a more simple and less costly type of hot melt apparatus, particularly intended for applications where an irregular demand is too high to be satisfactorily accommodated with individual gun type applicators that use resin in rod form, as exemplified by the Longval, et al. U.S. Pat., No. 3,314,574. Heretofore, however, the elimination of the costly extruder screw entailed the very undesirable alternative of accommodating an objectionably large volume of molten resin in order to insure that hot melt would always be available to meet potentially large but irregular demands.

Two prior patents contain a suggestion that appears to avoid this dilemma. They are Phillips, U.S. Pat. No. 3,598,282 and Lockwood U.S. Pat. No. 3,352,279. However, if they are regarded as disclosing inexpensive hot melt machines suitable for intermittent dispensing at irregularly varying rates, then they must be condemned as promising more than they produce. But the fact is that neither teaches a machine that is intended for such unpredictable dispensing; both are expressly intended for production line use, in which material is dispensed rather steadily and at a fairly constant rate.

In the machines of the two last mentioned patents, a hopper or holder for the solid resinous material, located above a heated reservoir, had an outlet at its bottom across which extended an electrically energized melting heating that supported the solid material but allowed the molten material to fall into the reservoir. Sensor means in the reservoir caused the heater to be energized whenever molten material in the reservoir was below a predetermined level and terminated energization when the reservoir had been replenished.

Although satisfactory in theory, this arrangement was found to be unsuccessful in practice, especially in cases where molten material was withdrawn from the reservoir at a substantially irregular rate. Melting of the resin was found to start promptly enough when the store of molten material fell below the critical level, but it often continued for a prolonged period after it should have terminated.

The possibility of such excessive melting is expressly contemplated in both patents. Phillips provided two sensors; one of them was at a low level in the reservoir and turned on the melting heater whenever liquid in the reservoir fell below its level; the other, at a higher level, was designated a "safety liquid level control" and turned off the melting heater when liquid in the reservoir reached that higher level. Lockwood's reservoir, described as being "of substantial volume," had a weir across it over which excess liquid overflowed to serve "as a cushion to smooth out variations in flow and to compensate for heat lag in some of the mechanism." Apparently Phillips was aware of what Lockwood characterized as "heat lag," since the structure disclosed by Phillips was so arranged that its reservoir was inherently of substantial volume.

Although it was obvious that one result of heat lag was to mandate an undesirably large reservoir, the cause of heat lag was by no means obvious. There was no inherent defect or deficiency in the sensor that controlled energization of the melting heater.

Careful and very persistent investigation finally disclosed that the melting heater was receiving heat from an unexpected source, and such heat input caused the heater to continue melting solid resin for a prolonged interval after its electrical supply had been cut off.

The source of this externally supplied heat was the heating element for the heated reservoir. Heat from it reached the melting heater by conduction through the walls of the reservoir and its molten contents, and thence by convection and radiation across the intervening space to the melting heater.

An obvious expedient for preventing transfer of heat from the reservoir to the melting heater was to increase the space between them by elevating the melting heater (and the hopper) to a substantial distance above the reservoir. Even when this expedient was carried to lengths that made for an undesirably bulky machine, it did not achieve prompt termination of melting upon deenergization of the melting heater.

The present invention achieves a simple solution to this problem without any undue sacrifice of compactness; and hence it is an object of the invention to provide hot melt apparatus having means for maintaining a substantially constant-volume supply of molten thermoplastic material in a heated reservoir, and for melting granular thermoplastic material and delivering it to the reservoir substantially in step with the rate at which the molten material is drawn out of the reservoir, without any tendency for such melting to continue after molten material in the reservoir has risen to a desired level.

Another important object of the invention is to provide simple and compact hot melt apparatus which achieves the objective just stated and which requires little maintenance.

It will be apparent from what is said above that it is another and more general object of the present invention to provide a hot melt machine that is capable of supplying hot melt under pressure to one or several dispensing nozzles at whatever rate the molten resin is to be withdrawn, and which machine has a pump and very simple and inexpensive means for supplying molten resin to the pump at a pressure sufficient to prevent pump cavitation, in contrast to the complex and expensive extruder screw and recirculating arrangements that characterized prior machines of equivalent capacity.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Referring now to the accompanying drawings, the hot melt machine of this invention comprises, in general, a hopper 5 that is adapted to hold a substantially large supply of thermoplastic hot melt resin in solid form, a melting heater 6 by which the resin is heated to its molten state, a heated reservoir 7 in which the molten resin is temporarily stored, and a gear pump 8 which receives hot melt from the reservoir and forces it towards one or more points of use.

As here shown, the hopper 5 is adapted for granular or pelletized resin, but it will become apparent as the description proceeds that a suitable and rather obvious modification of the illustrated hopper would enable the apparatus to be used with resin in a cylindrical block or "candle," in which form it is also supplied. The hopper is mounted at an elevation above the reservoir 7, and it has a relatively large outlet at its bottom across which extends the melting heater 6, in the form of a grid that can be heated electrically.

Granules of thermoplastic material in the hopper are normally supported by the melting heater grid, but when the grid is energized the granules that are closely adjacent to it are heated to their melting point and the molten material drops through the grid and into a shallow funnel 9 directly beneath it. From a substantially central outlet 10 in the funnel the molten material falls into the open topped heated reservoir 7, which is spaced a distance below the funnel. A heat shield 11, mounted between the reservoir and the funnel and vertically spaced from both of them, has a central hole 12 through which the molten material passes in falling from the funnel into the reservoir.

The reservoir 7 is seated on the body of the gear pump 8 and has an outlet 13 at its bottom that communicates directly with an upwardly opening inlet port 14 in the pump. The outlet of the pump is connected with ducting 15 that conducts pressurized molten material to one or more dispensing nozzles (not shown) at points of use.

The machine has a frame 16 comprising a flat bottom wall 17 that supports the several vertically superimposed parts described above and also comprises upright members 18 that support side walls 19 of thermal insulating material. The insulating walls 19 are spaced substantial distances laterally outwardly from the pump 8 and the heated reservoir 7, and they extend upwardly to a level just above the heated grid 6, to protectively enclose all of the hot parts of the machine. One of the insulating walls, designated 19', is common to the protective enclosure just mentioned and to a housing 20 for an electric motor 21 that drives the gear pump, so that the wall 19' protects the motor from the heat generated by the machine.

A conventional transmission comprising a chain 22 that extends through the wall 19' drivingly connects the motor with the pump. The motor 21 is a torque motor, rather than a positive drive motor, and therefore it causes the gear pump to maintain a substantially constant pressure on hot melt at the points of use, irrespective of whether hot melt is being withdrawn at any or all of those points and without the need for any expedient to provide for recirculation of the hot melt.

The heated reservoir 7 comprises a generally cylindrical open topped vessel having a band-type electric heating element 23 embracing its side wall 24 around the bottom thereof. The vessel itself can comprise a one-piece casting (preferably of aluminum, for good heat conductivity), having upright radially extending fins 25 in its interior that are integrally joined with its cylindrical side wall 24 and its rather thick bottom wall 26. The fins serve to distribute heat fairly evenly through the reservoir contents, compensating for the relatively low heat conductivity of the molten resin.

Figure 1:
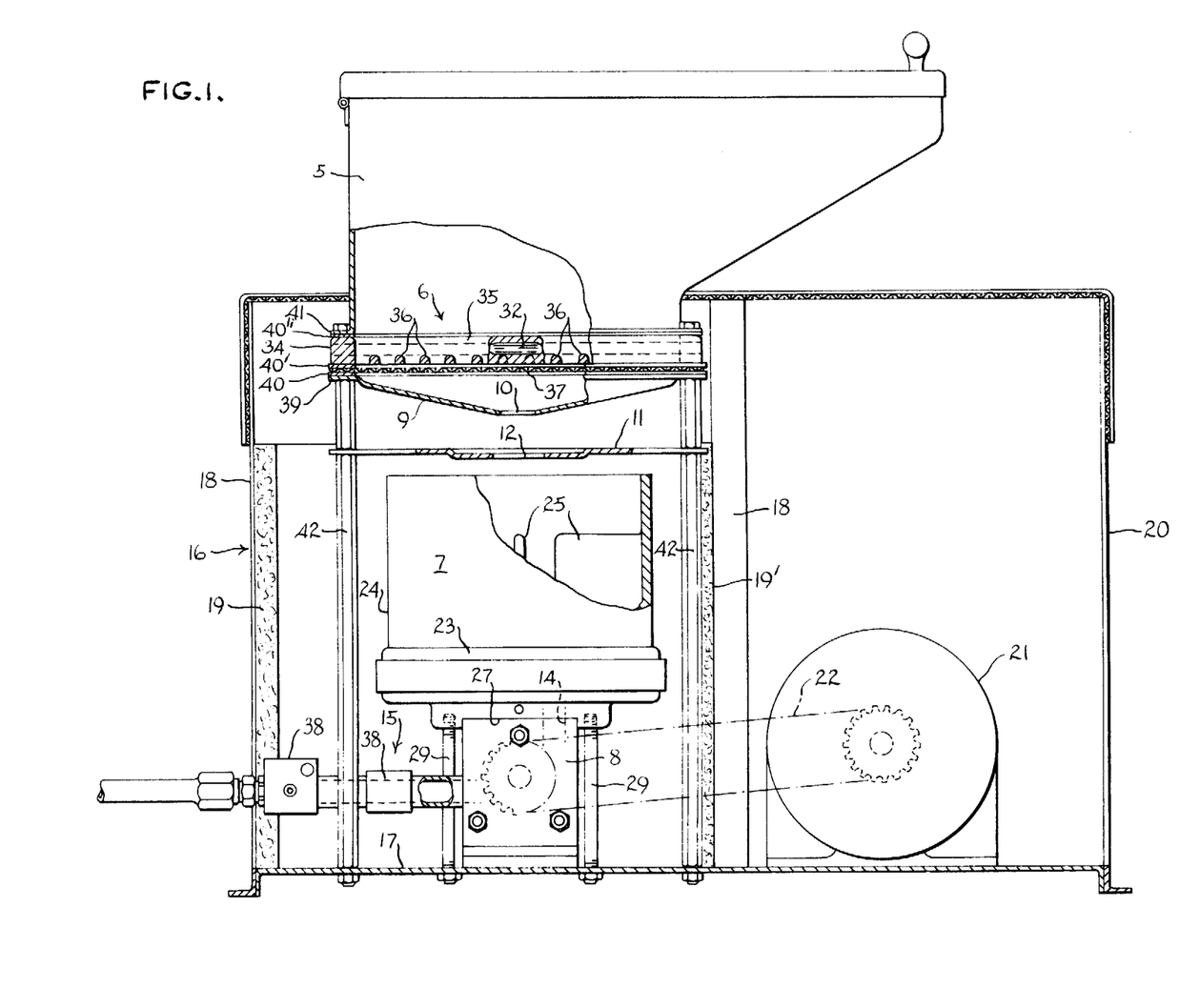
FIG. 1 is a view of the apparatus of this invention, generally in elevation but with substantial portions broken away.
Figure 2:
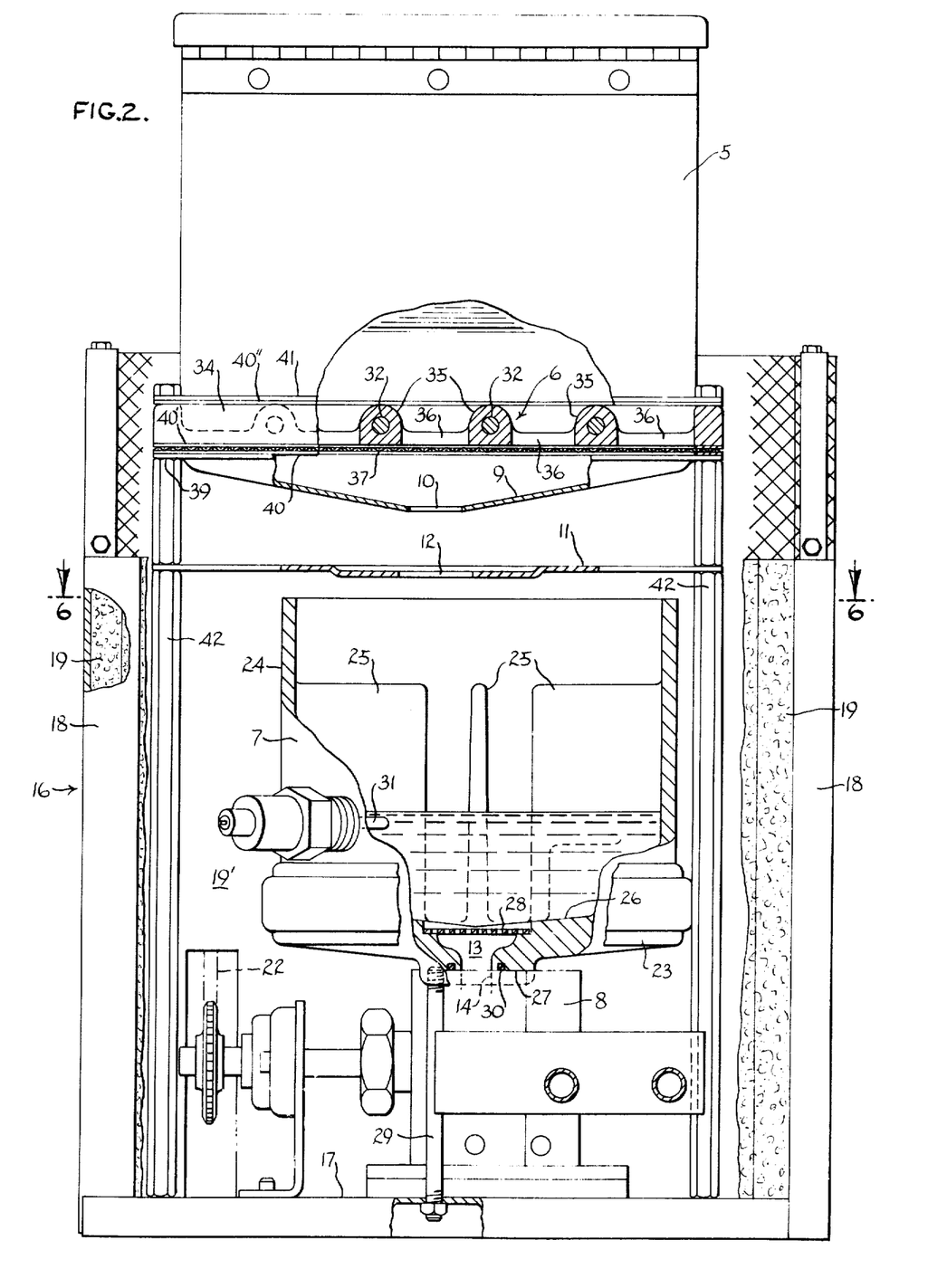
FIG. 2 is a side view of the apparatus on an enlarged scale, taken from the left side of FIG. 1, with portions broken away.
Figure 3:
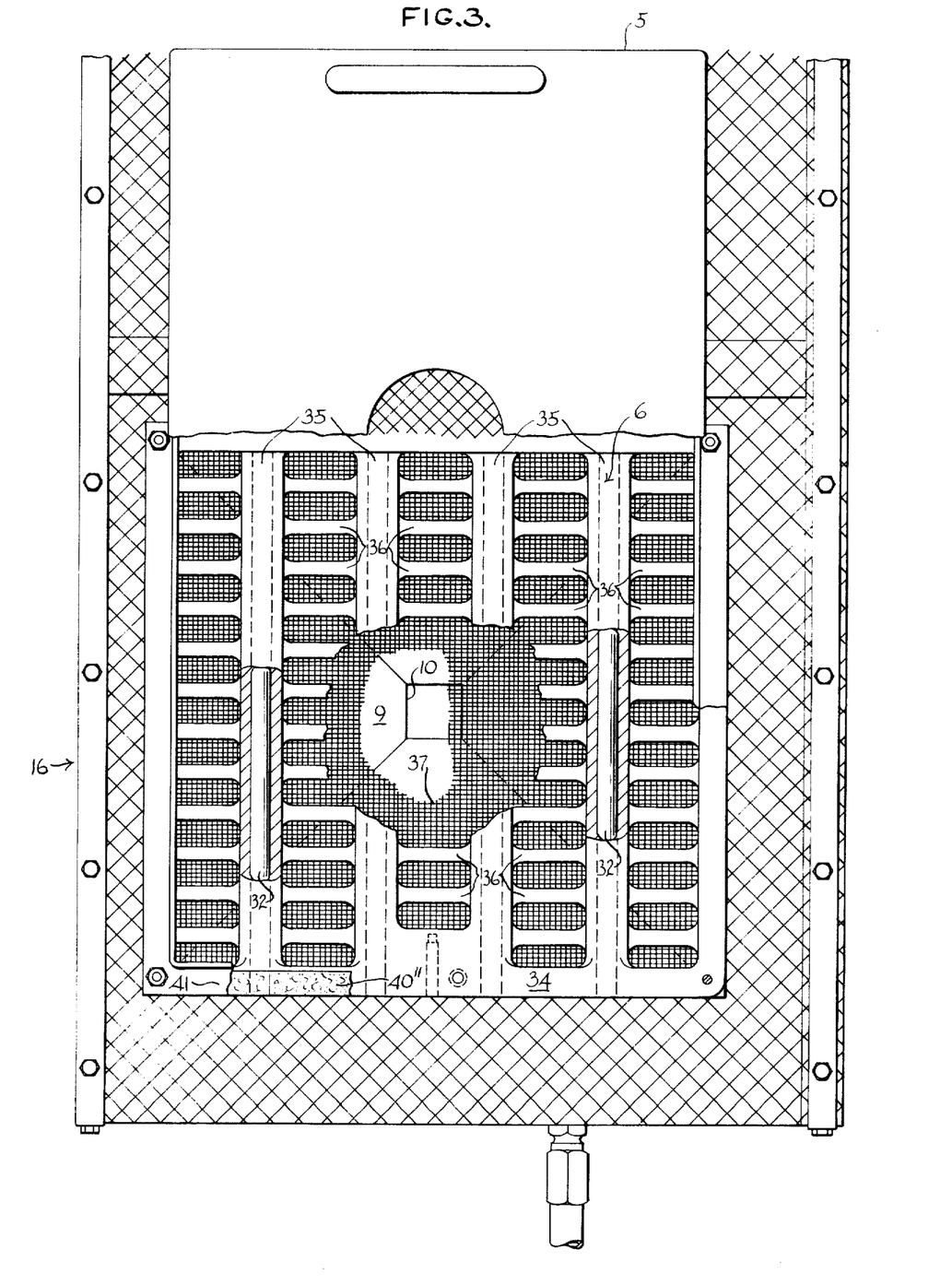
FIG. 3 is essentially a top view with portions broken away.
Figure 4:
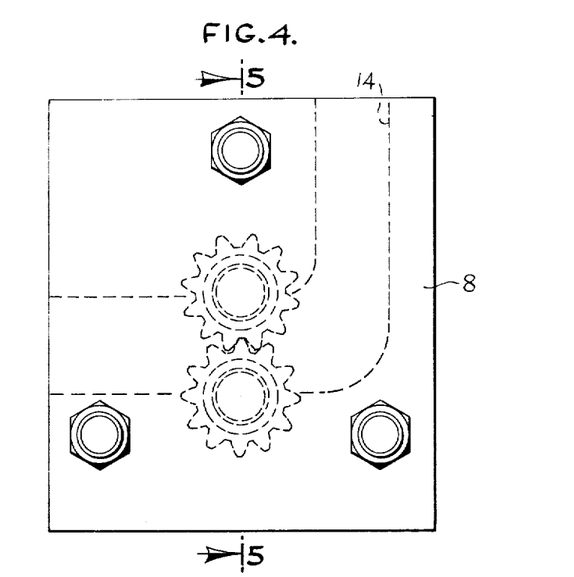
FIG. 4 is a view of the gear pump of the apparatus, in side elevation and to a further enlarged scale.
Figure 5:
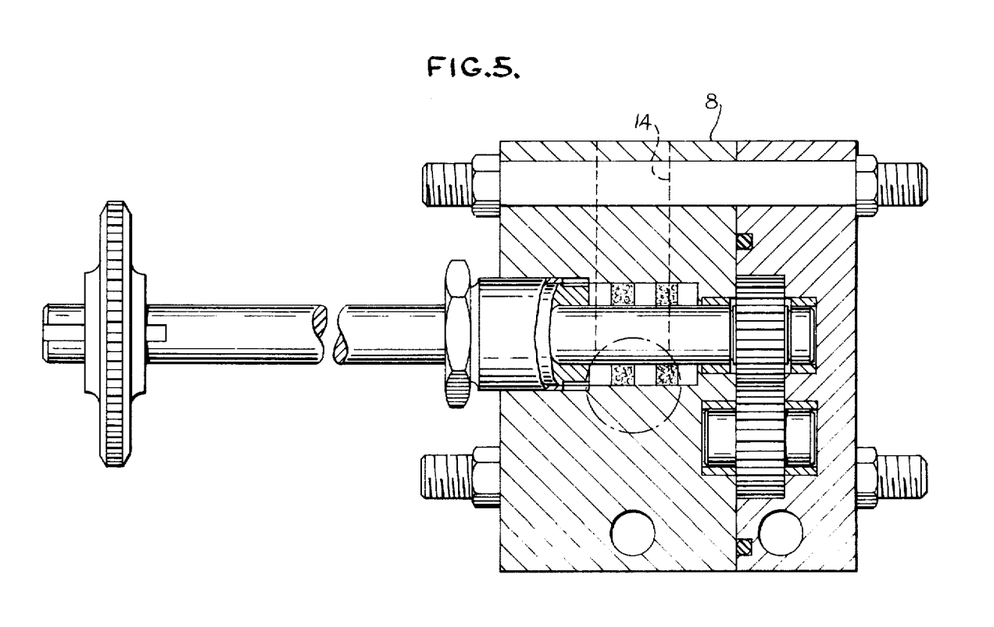
FIG. 5 is a vertical sectional view taken on the plane of the line 5—5 in FIG. 4.
Figure 6:
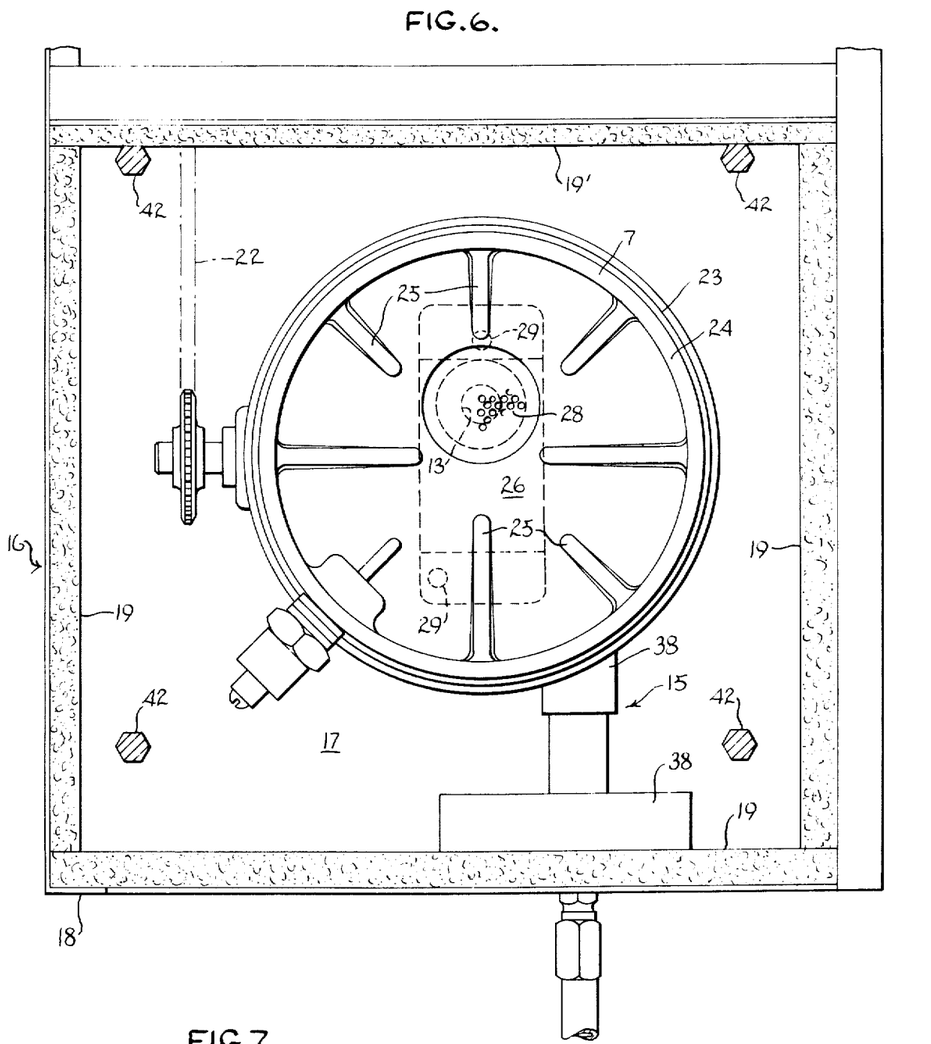
FIG. 6 is a view in horizontal section taken on the plane of the line 6—6 in FIG. 2.
Figure 7:
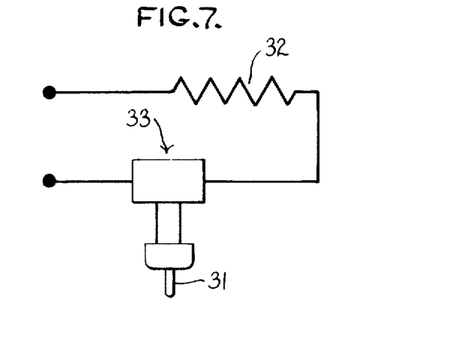
FIG. 7 is a diagram of the circuit comprising the melting heater and its control sensor.

The outlet opening 13 through the bottom wall 26 of the reservoir vessel can be more or less funnel-shaped in vertical section, as shown in FIG. 2, and preferably there is a relatively fine mesh screen 28 across its upper end to keep particulate material out of the pump. The vessel has a flat undersurface 27 at its center that opposes a flat top surface on the pump body to which the pump inlet port 14 opens. The pot 14 of the pump is of course aligned with the outlet 13 in the reservoir vessel. Tie bolt 29 extending up through the bottom wall 17 of the frame and having their upper ends threaded into the bottom wall 26 of the reservoir vessel, secure the reservoir and the pump to one another and to the frame and maintain sealing compression upon an annular gasket 30 that is confined between the opposing pump and reservoir surfaces.

It will be understood that one or more heaters 38 are associated with the ducting 15 that carries hot melt away from the pump, to raise the temperature of the material as it flows to the point or points of use, and that there can also be a heater (not shown) associated with the gear pump.

A liquid level detector or sensor 31 is received in a threaded bore through the side wall of the reservoir, in spaced relation to both the top and the bottom thereof. The sensor starts energization of the heating grid whenever molten material in the reservoir vessel falls below a predetermined level and terminates such energization when the molten material has been replenished to that level. While the sensor could be a float actuated switch, a temperature sensing device or the like, it is illustrated as a capacitance sensor, responsive to the different dielectric properties of air and of molten resin, and hence it is connected with the resistance heating element 32 of the melting heater 6 through suitable known means, indicated generally at 33 and comprising exciter, amplifier and relay means.

As shown, the melting heater 6 comprises a unitary casting 34 that consists of elongated, parallel tubular members 35 connected with one another by short, transversely extending parallel bars 36. The resistance heater 32 of the grid comprise a rod-type heating element received in the core of each of the tubular members 35, to provide a substantially uniform distribution of heat across the casting. To further promote such heat distribution, the casting is made of a material such as aluminum that is a good conductor of heat.

Directly underlying the grid casting 34, and functionally comprising a part of the heating grid, is a screen 37. Since the screen 37 receives heat from the heating elements 32 by direct radiation from the casting, it is preferably of stainless steel. It has a mesh fine enough to support resin granules even when their size is reduced by a substantial degree of melting, but of course it permits the molten material to fall through its interstices onto the funnel 9 beneath it.

For reasons explained above, the heated reservoir 7 should not normally contain substantially more molten resin than is needed for immediate use; but there should be a good head of liquid in the reservoir, to insure against the pump 8 being starved. Furthermore, the top surface area of the reservoir should be as small as possible, to minimize objectionable oxidization of the hot melt. THese requirements are satisfied by providing the reservoir with an inside diameter which is about equal to its height.

However, the area of the heated grid 6 is substantially larger than that of the open top of the reservoir, to insure adequately fast melting of resin for prompt replenishment of the reservoir contents. The funnel 9 serves to collect the molten material that falls from the grid and to channel all of it into the reservoir. The funnel can be formed from a single piece of sheet metal, to a shallow inverted pyramidal shape with a coplanar rim or flange 39 around its rectangular outer edge.

The funnel is sealed to a laterally projecting flange 41 around the bottom of the hopper by means of gaskets 40, 40', 40''. The gasket 40, interposed between the funnel rim 39 and the screen 37, also serves as a heat barrier. The gasket 40' between the screen 37 and the casting 34 is intended solely for sealing, and should afford the least possible heat insulation between those elements of the melting heater. The gasket 40'' between the casting 34 and the hopper flange 41 serves as both a liquid seal and a thermal insulation that minimizes transmission of heat from the casting 34 to the hopper walls.

The heat shield 11, which can be made of sheet metal, serves as a barrier or baffle that prevents heat from the reservoir from being conducted or radiated to the heating grid, thus allowing the grid to cool promptly when energization of it is terminated. The gasket 40 enables the funnel 9 to cooperate to some extent with the heat shield in performing this heat barrier function.

The heat shield 11, the funnel 9, the heating grid 6 and the hopper 5 are supported on four upright posts 42 that project up from the bottom wall 17 of the frame. Each of these posts 42 can comprise two lengths of hexagonal stock that have a screw-threaded telescoping connection with one another through the edge of the heat shield. Note that the posts are spaced substantial distances laterally outwardly from the reservoir and the pump, and therefore they have no tendency to be heated by the heating element 23 for the reservoir or any heating element associated with the pump. However, the posts can serve to conduct heat downwardly from the heat shield to the bottom wall 17 of the frame which, being in a cool zone, can serve as a heat sink. Because working parts of the machine are supported on the posts 42, in spaced relation to the walls 19 of the enclosure, those walls can comprise relatively inexpensive heat insulation.

From the foregoing description taken with the accompanying drawings it will be apparent that this invention affords simple and inexpensive means for melting resinous thermoplastic material and feeding it to a heated reservoir at a rate that is effectively kept in step with the rate at which molten material is withdrawn from the reservoir, to reliably maintain a small but substantially constant store of the molten material in the reservoir; and that the invention thus makes possible the provision of a high capacity but inexpensive hot melt machine suitable for use in situations where there is a relatively large but irregularly varying demand for molten resinous material.

Those skilled in the art will appreciate that the invention can be embodied in forms other than as herein disclosed for purposes of illustration.

The invention is defined by the following claims:

1. In hot melt apparatus that comprises a hopper for holding a store of thermoplastic material in a solid state and delivery means for conducting material from the hopper, in molten state, to a point of use at which it is dispensed, hot melt supply means by which the solid material is brought to the molten state at a rate substantially in step with the rate at which molten material is dispensed and by which a substantially constant-volume supply of the molten material is kept available for immediate dispensing, said hot melt supply means comprising:
   A. a melting heater extending across an outlet at the bottom of the hopper and arranged to support thermoplastic material in its solid state but to permit molten thermoplastic material to fall;
   B. means for electrically energizing the melting heater to heat the same to a temperature high enough to melt thermoplastic material;
   C. an open topped reservoir spaced beneath the melting heater, the area of the open top of said reservoir being substantially smaller than the area of the melting heater, and said reservoir having an outlet at its bottom that communicates with said delivery means;
   D. a funnel beneath the melting heater for collecting molten material falling therefrom, said funnel having an outlet over the open top of the reservoir for constraining the molten material to fall into the same;
   E. heater means for heating the reservoir contents to maintain the same in molten condition;
   E. heat shield means above the top of the reservoir and underlying the funnel, to prevent transmission to the melting heater of heat from the reservoir, said heat shield means having a hole therethrough which is vertically aligned with the outlet of the funnel to allow molten material to drop into the reservoir from the outlet in the funnel;
   G. sensing means in the reservoir at a level spaced from both the top and the bottom thereof, for detecting the presence of molten thermoplastic material at said level in the reservoir; and
   H. means operatively connecting said sensing means with said means for electrically energizing the melting heater, to initiate energization of the melting heater whenever molten material in the reservoir is below said level and to terminate such energization when such molten material reaches said level.

2. The apparatus of claim 1, further characterized by: said heat shield means comprising a plate-like baffle spaced beneath the funnel and spaced above the top of the reservoir.

3. The apparatus of claim 1, wherein the melting heater comprises a grid and the funnel has a rim that underlies the marginal edge portion of the grid, further characterized by:
   gasket means interposed between the grid and the rim of the funnel to thermally insulate the funnel from the grid.

4. The apparatus of claim 1, further characterized by:
   1. said reservoir comprising a substantially cylindrical one piece metal vessel having integral fins projecting into its interior from its walls, to distribute heat through its contents; and
   2. said heater means comprising an electrical heating element embracing the lower portion of said vessel at the exterior thereof.

5. The apparatus of claim 4, further characterized by:
   3. said vessel having a flat bottom surface to which its outlet opens;
   4. said delivery means comprising a gear pump having an inlet portion with a flat top surface to which an inlet port opens; and
   5. means securing the vessel to the inlet portion of the gear pump with said flat bottom surface on the vessel overlying said flat top surface on the gear pump, and with the outlet in the vessel aligned with the inlet port in the pump.

6. The apparatus of claim 5, further characterized by:
   6. a constant torque motor drivingly connected with the gear pump.

7. Hot melt apparatus by which thermoplastic resin from a supply thereof in solid state is heated to its melting temperature and, while molten, is delivered under pressure to a point of use to be available for dispensing, said hot melt apparatus comprising:
   A. an open topped reservoir for molten material having an outlet at its bottom;
   B. heater means associated with the reservoir for heating the contents thereof to maintain the same in molten condition;
   C. a hopper for holding a supply of solid resin, spaced a distance above the reservoir and having an outlet at its bottom that is of substantially larger area than the open top of the reservoir;
   D. an electrically energizable melting heater extending across said outlet in the hopper, for supporting the solid contents of the hopper and melting a lowermost portion of the same, and which permits molten resin to drop towards the reservoir;

E. a funnel beneath the melting heater by which molten resin dropping from the melting heater is collected and constrained to fall into the reservoir;
F. a sensor in the reservoir, intermediate the top and bottom thereof, responsive to the level of liquid in the reservoir;
G. means connected between said sensor and the melting heater for initiating energization of the latter whenever molten resin in the reservoir falls below a predetermined level and for terminating such energization when the reservoir has been replenished to said level;
H. a heat shield between the funnel and the reservoir by which heat from said heater means is prevented from reaching the melting heater, to assure that melting of resin will terminate promptly upon termination of energization of the melting heater; said heat shield having a hole therein through which molten material falls from the funnel into the reservoir;
I. a positive displacement rotary pump having an inlet communicated with said outlet in the reservoir and having an outlet communicated with said point of use; and
J. constant torque drive means for said pump.

8. The hot melt apparatus of claim 7, wherein said outlet in the reservoir is in the bottom wall thereof and opens downwardly, further characterized by:
 1. the pump having its inlet opening upwardly; and
 2. the reservoir being mounted on top of the pump, with its outlet communicating with the inlet of the pump, to make available to the pump a head of molten material adequate to prevent cavitation thereof.

9. The hot melt apparatus of claim 8, further characterized by:
 3. enclosure means having
   a. a flat bottom surface upon which the pump rests and
   b. thermally insulating walls in outwardly spaced relation to the pump and reservoir extending upwardly from said bottom surface to a level above the melting heater to protectively enclose hot parts of the machine;
 4. means providing a connection between the reservoir and the bottom surface of said enclosure means whereby the reservoir is secured to the pump in fixed relation to it and said bottom surface; and
 5. supporting posts projecting upwardly from said bottom surface in laterally spaced relation to the pump, the reservoir and the wall means, said supporting posts being secured to the heat shield, the funnel, and the hopper to support the same.

10. Hot melt apparatus of the type comprising a hopper for thermoplastic resin in its solid state, an electrically energizable melting heater extending across an outlet in the bottom of the hopper to support solid state resin in the hopper and by which a lower portion of such resin can be melted and permitted to fall to a lower level, a heated open-topped reservoir beneath the melting heater in which molten resin is temporarily stored before its delivery to a point of utilization, and a sensor in the reservoir, responsive to the level of molten resin therein, for controlling energization of the melting heater by initiating such energization when molten resin in the reservoir falls below a predetermined level and terminating such energization when the reservoir is replenished to said level, said hot melt apparatus being characterized by:
A. the area of the open top of said reservoir being substantially smaller than the area of said melting heater, so that the melting heater can melt resin at a rate that quickly replenishes the reservoir but the reservoir has a small volume for its depth and causes a small area of molten material surface to be exposed to air;
B. a funnel beneath the melting heater with an outlet over the reservoir for collecting molten material falling from the melting heater and constraining it to drop into the reservoir; and
C. heat shield means between the reservoir and the funnel by which heat from the reservoir is substantially prevented from reaching the melting heater, to insure that melting of solid resin terminates promptly upon termination of energization of the melting heater, said heat shield means having a hole through which molten resin passes in dropping from the funnel into the reservoir.

11. The apparatus of claim 10, further characterized by:
D. a pump by which molten material from the reservoir is delivered under pressure to said point of utilization; and
E. said pump being mounted at a level below the reservoir,
 1. the pump having an upwardly opening inlet, and
 2. the reservoir having a downwardly opening outlet in its bottom that communicates with said inlet to insure that an adequate head of molten resin will be available to the pump to prevent cavitation thereof.

* * * * *